(12) United States Patent
Mohammad et al.

(10) Patent No.: US 8,811,601 B2
(45) Date of Patent: Aug. 19, 2014

(54) INTEGRATED ECHO CANCELLATION AND NOISE SUPPRESSION

(75) Inventors: Asif I. Mohammad, San Diego, CA (US); Kwokleung Chan, San Diego, CA (US); Ian Ernan Liu, San Diego, CA (US); Erik Visser, San Diego, CA (US); Dinesh Ramakrishnan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 673 days.

(21) Appl. No.: 13/079,548

(22) Filed: Apr. 4, 2011

(65) Prior Publication Data

US 2012/0250882 A1    Oct. 4, 2012

(51) Int. Cl.
    *H04M 9/08*    (2006.01)
    *H04B 3/23*    (2006.01)

(52) U.S. Cl.
    CPC ..................... *H04B 3/234* (2013.01)
    USPC .................................... 379/406.01

(58) Field of Classification Search
    CPC ....................................... H04B 3/234
    USPC .................................... 379/406.01
    See application file for complete search history.

(56) References Cited

U.S. PATENT DOCUMENTS

| 7,046,794 | B2 | 5/2006 | Piket et al. | |
| 7,647,077 | B2 | 1/2010 | Hui et al. | |
| 2007/0230712 | A1 | 10/2007 | Belt et al. | |
| 2009/0238377 | A1* | 9/2009 | Ramakrishnan et al. | 381/92 |
| 2009/0274315 | A1 | 11/2009 | Carnes et al. | |
| 2010/0103776 | A1 | 4/2010 | Chan | |
| 2012/0245933 | A1* | 9/2012 | Flaks et al. | 704/233 |

FOREIGN PATENT DOCUMENTS

| JP | 2010028653 A | 2/2010 |
| WO | 03010996 A2 | 2/2003 |
| WO | 2008041878 A2 | 4/2008 |

OTHER PUBLICATIONS

International Search Report and Written Opinion—PCT/US2012/032217—ISA/EPO—Jul. 9, 2012.
Kellermann, W., "Strategies for Combining Acoustic Echo Cancellation and Adaptive Beamforming Microphone Arrays," IEEE International Conference on Acoustics, Speech, and Signal Processing, ICASSP-97., vol. 1, pp. 219-222, Apr. 1997.
Nedelko Grbic, et al., "Acoustic Echo Cancelling and Noise Suppression with Microphone Arrays," Department of Telecommunications and Signal Processing (available at http://www.bth.se/fou/forskinfo.nsf/0/436ed8c3c7c0ba4bc12568a3002cabf3/$FILE/Research%20Report%204-99.pdf).
W. Herbordt, et al., "GSAEC—Acoustic Echo Cancellation Embedded into the Generalized Sidelobe Canceller," IEEE ICASSP 2000.

* cited by examiner

*Primary Examiner* — Alexander Jamal
(74) *Attorney, Agent, or Firm* — Anthony Mauro; Espartaco Diaz Hidalgo (57) ABSTRACT

A method for echo cancellation and noise suppression is disclosed. Linear echo cancellation (LEC) is performed for a primary microphone channel on an entire frequency band or in a range of frequencies where echo is audible. LEC is performed on one or more secondary microphone channels only on a lower frequency range over which spatial processing is effective. The microphone channels are spatially processed over the lower frequency range after LEC. Non-linear noise suppression post-processing is performed on the entire frequency band. Echo post-processing is performed on the entire frequency band.

40 Claims, 9 Drawing Sheets

INTEGRATED ECHO CANCELLATION AND NOISE SUPPRESSION

TECHNICAL FIELD

The present disclosure relates generally to electronic devices for communication systems. More specifically, the present disclosure relates to integrated echo cancellation and noise suppression.

BACKGROUND

Electronic devices (cellular telephones, wireless modems, computers, digital music players, Global Positioning System units, Personal Digital Assistants, gaming devices, etc.) have become a part of everyday life. Small computing devices are now placed in everything from automobiles to housing locks. The complexity of electronic devices has increased dramatically in the last few years. For example, many electronic devices have one or more processors that help control the device, as well as a number of digital circuits to support the processor and other parts of the device.

Wireless communication systems are widely deployed to provide various types of communication content such as voice, video, data and so on. These systems may be multiple-access systems capable of supporting simultaneous communication of multiple communication devices with one or more base stations.

To improve voice quality in a wireless communication system, a communication device may use various signal processing techniques. These techniques may attempt to recreate a speaker's voice while eliminating unwanted sounds. Therefore, benefits may be realized by systems and methods for integrated echo cancellation and noise suppression.

SUMMARY

A method for echo cancellation and noise suppression is disclosed. Linear echo cancellation (LEC) is performed for a primary microphone channel on an entire frequency band or in a range of frequencies where echo is audible. LEC is performed on one or more secondary microphone channels only on a lower frequency range over which spatial processing is effective. The microphone channels are spatially processed over the lower frequency range after LEC. Non-linear noise suppression post-processing is performed on the entire frequency band. Echo post-processing is performed on the entire frequency band.

In one configuration, the higher frequencies of the primary microphone are preserved through spatial processing. The spatial processing may include beamforming or phase correlation-based masking. The lower frequency range that is non-linear noise suppression post-processed may be spatially processed and a higher frequency range that is non-linear noise suppression post-processed may be from the primary microphone channel and may not have been spatially processed.

The spatial processing may be performed based on a doubletalk flag that indicates when far-end speech and near-end speech periods overlap or when echo attenuation provided during linear echo cancellation is low. The doubletalk flag may be determined using a computed probability according to the equation $$prob = \left(1 - \left(\frac{1}{1 + e^{-ERLE}}\right)\right)$$

where ERLE is a measure of echo attenuation provided during linear echo cancellation. No spatial processing may be performed when the doubletalk flag indicates that far-end and near-end speech periods overlap or that echo attenuation provided by a linear echo cancellation (LEC) module is low.

The echo post-processing may include performing non-linear echo post-processing on the microphone channels based on one or more doubletalk flags where the non-linear echo post-processing removes residual non-linear echo from the microphone channels. The echo post-processing may also include performing non-linear echo clipping flags that indicate high attenuation of the primary microphone channel during linear echo cancellation where the non-linear echo clipping removes residual echo from the microphone channels. The echo post-processing may also include injecting comfort noise into the microphone channels.

The clipping flags may track echo attenuation during linear echo cancellation. The clipping flag may be high if echo attenuation provided during linear echo cancellation is above a predetermined threshold and low if the echo attenuation provided during linear echo cancellation is below a predetermined threshold.

An apparatus for echo cancellation and noise suppression is also disclosed. The apparatus includes a linear echo canceller that performs linear echo cancellation (LEC) for a primary microphone channel on an entire frequency band or a portion of the entire frequency band where echo is audible and one or more secondary microphone channels only on a lower frequency range over which spatial processing is effective. The apparatus also includes a spatial processor that spatially processes the microphone channels over the lower frequency range after LEC. The apparatus also includes a non-linear noise suppression post-processor that performs non-linear noise suppression post-processing on the entire frequency band. The apparatus also includes an echo post-processor that performs echo post-processing on the entire frequency band.

An apparatus for echo cancellation and noise suppression is also disclosed. The apparatus includes means for performing linear echo cancellation (LEC) for a primary microphone channel on an entire frequency band or a portion of the entire frequency band where echo is audible. The apparatus also includes means for performing LEC for one or more secondary microphone channels only on a lower frequency range over which spatial processing is effective. The apparatus also includes means for spatially processing the microphone channels over the lower frequency range after LEC. The apparatus also includes means for performing non-linear noise suppression post-processing on the entire frequency band.

A computer-program product for echo cancellation and noise suppression is also disclosed. The computer-program product comprises a non-transitory computer-readable medium having instructions thereon. The instructions include code for causing a communication device to perform linear echo cancellation (LEC) for a primary microphone channel on an entire frequency band or a portion of the entire frequency band where echo is audible. The instructions also include code for causing the communication device to perform LEC for one or more secondary microphone channels only on a lower frequency range over which spatial processing is effective. The instructions also include code for causing the communication device to spatially process the microphone channels over the lower frequency range after LEC. The instructions also include code for causing the communication device to perform non-linear noise suppression post-processing on the entire frequency band. The instructions also include code for causing the communication device to perform echo post-processing on the entire frequency band.

DETAILED DESCRIPTION

Communication technologies continue to evolve in many arenas, often presenting newer challenges. With the advent of mobile phones and blue-tooth headsets one can now imagine a true full-duplex conversation in very harsh environments (low signal to noise ratios). Signal enhancement, echo cancellation (EC) and noise suppression (NS) may be used in these scenarios. Traditionally, researchers have looked at EC and NS problems independently. Over the years, the form factor of mobile phones and Bluetooth headsets have been reduced in response to consumer preferences. However, this creates challenges to manufacturers because the microphones are farther away from the mouth, i.e., the signal level of speech pickup is lowered. Since mobile phones and Bluetooth headsets are widely used outside the home or office environment, background noise may be substantial. Since the distance between the microphone and loudspeaker shrinks when the headset/handset gets smaller, the acoustic echo pickup becomes more severe. Furthermore, the acoustic echo may be non-linear due to the small size of speakers in the headset/handset devices. Therefore, non-linear echo processors may be used to suppress the residual echo and give the users a pleasant full-duplex experience. Echo suppression methods other than EC may impair full-duplex communication and thus may only be acceptable as supplementary measures.

In the ideal case where acoustic echoes are coming from an undesirable spatial direction, noise suppression modules may provide a maximum of 8-15 dB of echo suppression. In other words, noise suppression modules may provide a maximum of 0-15 dB of echo suppression based on its spatial directivity. In teleconferencing or car telephony environments, echo attenuation of at least 40 dB during single talk and 30 dB during doubletalk may be used. An explicit echo canceller may be used to achieve this attenuation. Furthermore, it may be desirable for a microphone array to pick up a desired talker at a good signal-to-noise ratio and to provide signal enhancement, even when the desired talker is located relatively far away compared to the echo source. Thus, in order to accomplish an efficient and pleasant full-duplex conversation using such teleconferencing devices, acoustic echo cancellation and microphone arrays may be used and combined in a way to improve the overall performance of a multi-microphone echo cancellation noise suppression system. Inter-operability and integration of echo cancellation and noise suppression functionality may thus be help to achieve superior performance.

Figure 1:
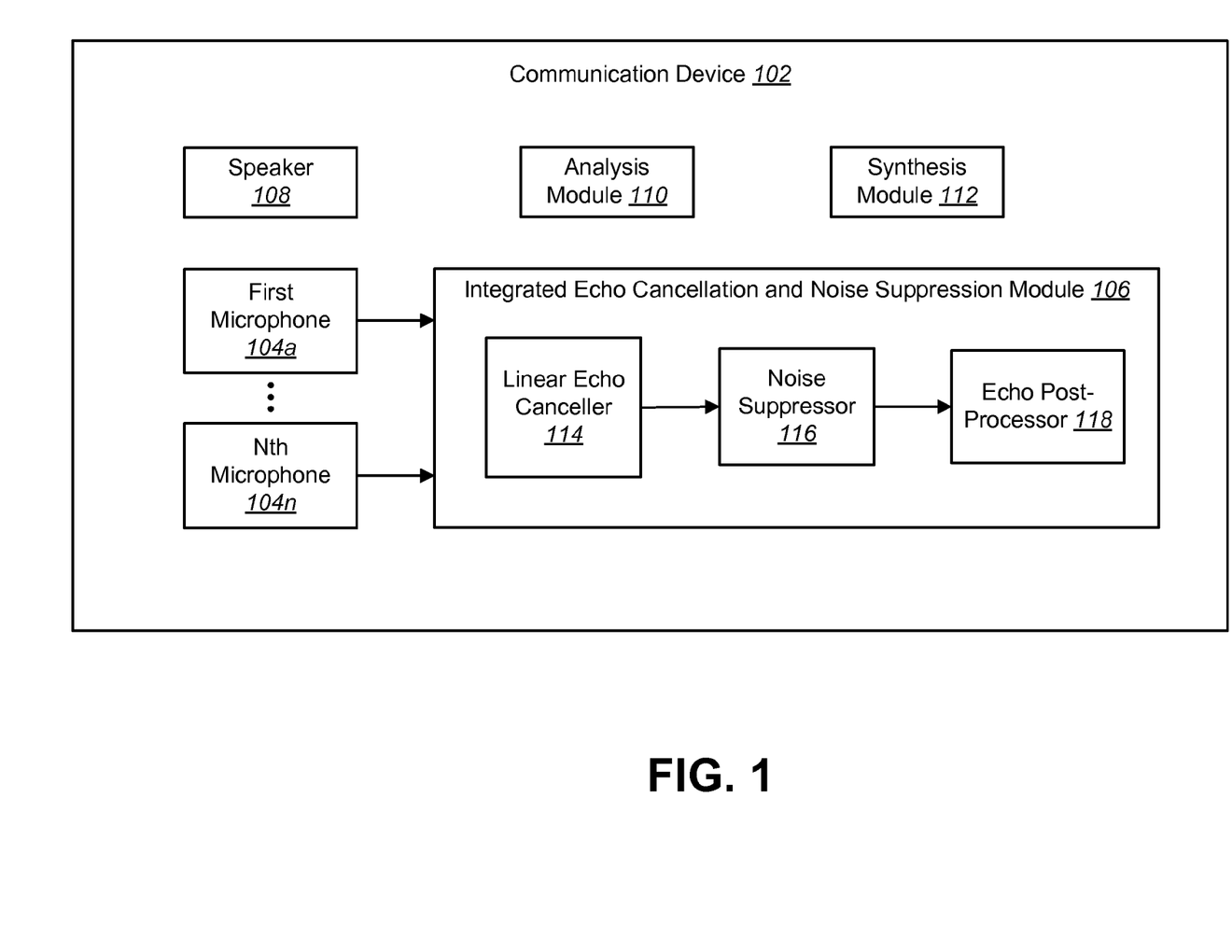
FIG. 1 is a block diagram illustrating a communication device with an integrated echo cancellation and noise suppression module.

FIG. 1 is a block diagram illustrating a communication device 102 with an integrated echo cancellation and noise suppression module 106. The communication device 102 may include N microphones 104a-n that receive sound input from one or more sources, e.g., a speaker, background noise, echo from a speaker 108, etc. Each of the N microphones 104a-n may produce a signal or channel of audio that may be slightly different than one another. In one configuration, there may be four microphones 104a-n that produce four channels of audio. Although not shown, the microphones 104a-n and speaker 108 may use additional modules to process acoustic signals into digital audio and vice versa. For example, the communication device 102 may include analog-to-digital converters, digital-to-analog converters, audio buffers, an automatic volume control module, etc. The communication device 102 may also include more than one speaker 108.

As used herein, the term "communication device" refers to an electronic device that may be used to receive, externally play and/or optimize audio to and from a user. Examples of communication devices include telephones, speaker phones, cellular phones, personal digital assistants (PDAs), handheld devices, wireless modems, laptop computers, personal computers, etc. A communication device 102 may alternatively be referred to as an access terminal, a mobile terminal, a mobile station, a remote station, a user terminal, a terminal, a subscriber unit, a subscriber station, a mobile device, a wireless device, user equipment (UE) or some other similar terminology.

The communication device 102 may also include an analysis module 110 and a synthesis module 112 to deconstruct and reconstruct audio signals, respectively. This may allow other modules discussed herein to process the audio, e.g., perform echo cancellation and noise suppression. The analysis module 110 and synthesis module 112 may refer to finite impulse response filter (FIR) banks that decompose a wideband signal into sub-bands and reconstructs the sub-bands into a single band, respectively.

Echo cancellation (EC) and multi-microphone noise suppression (NS), such as beamforming or masking, may be two distinct signal processing concepts, however their goals may converge with regard to acoustic echoes. Specifically, linear echo cancellation may subtract an echo estimate from the desired signal based on reference information, while noise suppression may blindly remove undesired interference (e.g., echoes) within a microphone signal using spatial filtering. Therefore, the communication device 102 may include an integrated echo cancellation and noise suppression module 106 with a linear echo canceller (LEC) 114, a noise suppressor (NS) 116 and an echo post-processor 118.

Linear echo cancellation may be performed for selected frequencies for the signals received from the microphones 104a-n. In one configuration, the linear echo of the full band of frequencies received from the primary microphone 104a is cancelled while LEC is performed for only a set of low-band frequencies for the secondary (non-primary) microphones 104b-n. The frequencies selected for LEC on the secondary channels may correspond to the range of frequencies over which spatial processing in the noise suppressor 116 is effective.

The noise suppressor 116 may perform spatial processing and/or noise suppression post-processing based on a noise reference from a spatial processor. In other words, the noise suppressor 116 may attenuate the echo as undesired interference based on spatial filtering. The echo post-processor 118 may perform non-linear echo post-processing by attenuating the non-linear echoes. The echo post-processor 118 may also perform non-linear echo clipping and comfort noise injection.

The three modules in the integrated echo cancellation and noise suppression module 106 may operate together so that their combined effect is greater than the sum of their individual effects on the overall performance of the system. In other words, the synergy between the linear echo cancellation 114, spatial processing within the noise suppressor 116, NS post-processing and non-linear EC post-processor 118 combine in a mutually beneficial way, i.e., the noise suppression improves the echo cancellation and vice versa. Additionally, the order of operations (LEC 114 first, NS 116 second and echo post-processing 118 third) may avoid the introduction of nonlinearities and/or rapidly varying tracking beams (from spatial processing) to the LEC module 114.

Figure 2:
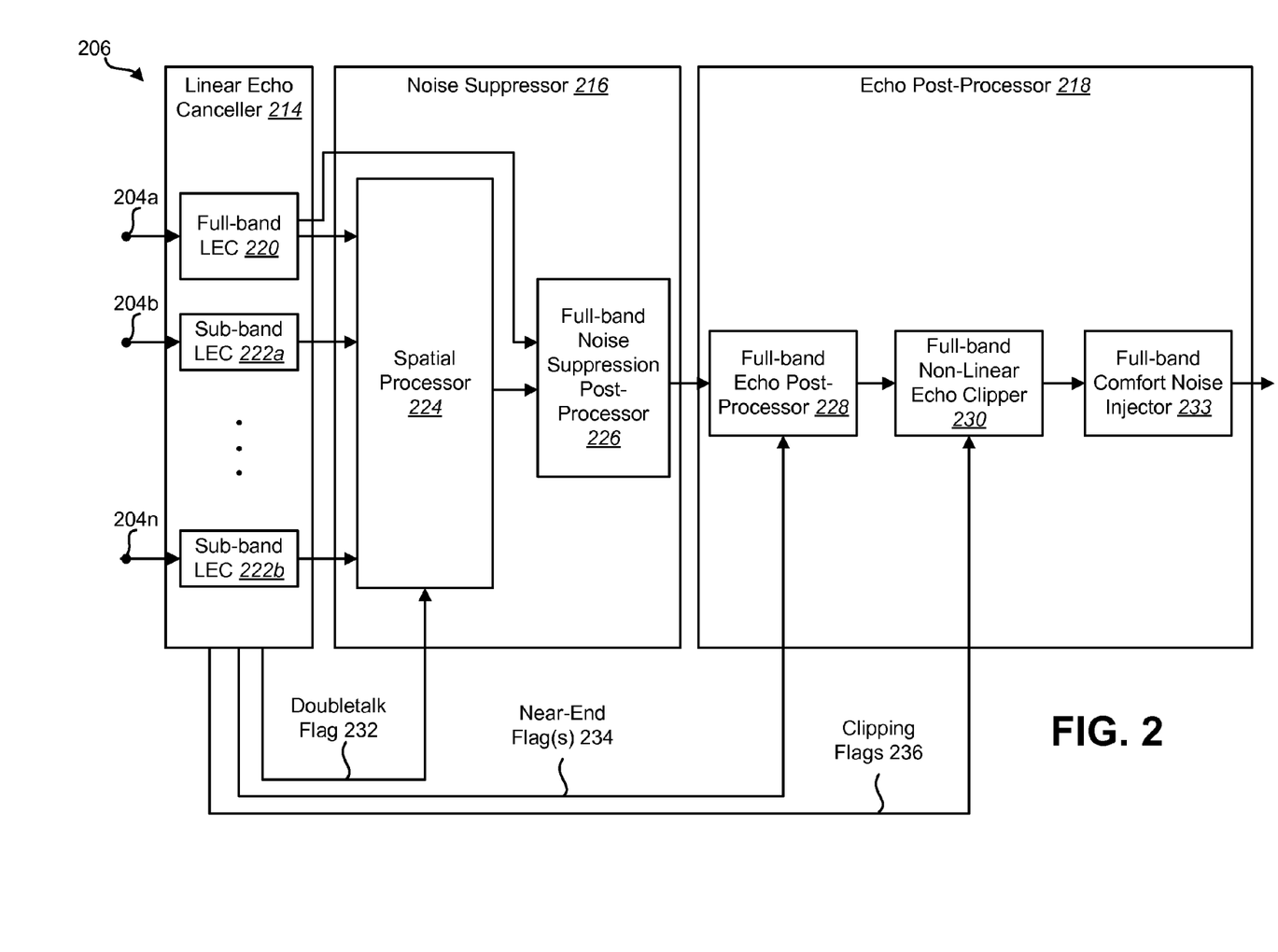
FIG. 2 is a block diagram illustrating an integrated echo cancellation and noise suppression module with a linear echo canceller, a noise suppressor and an echo post-processor.

FIG. 2 is a block diagram illustrating an integrated echo cancellation and noise suppression module 206 with a linear echo canceller 214, a noise suppressor 216 and an echo post-processor 218. For efficient echo cancellation, the linear echo canceller 214 (i.e., linear adaptive filter(s)) may be at the front of the processing chain, i.e., to avoid any non-linear processes and also to avoid re-modeling/re-learning the rapid variations in the processing path due to the spatial processor 224. Echo cancellation at the front of the processing chain may also be beneficial for the spatial processing because echo cleaned signals are given to the microphone array for further processing. This may adaptively localize the desired source with more accuracy and reduce false learning towards the echo source.

The linear echo canceller 214 may receive the primary audio channel from a primary microphone 204a and one or more secondary audio channels from one or more secondary microphones 204b-n. Since a loud-speaker 108 may be located relatively close to the microphone(s) 204a-n compared to the desired talker, the microphone(s) 204a-n may see a near-end signal-to-echo ratio in the range of −5 to −12 dB. Thus, the full-band LEC 220 and the sub-band LECs 222a-b may be designed efficiently and in order to bring the residual echoes below the desired talker's level at all times for the spatial processor 224 to work optimally.

Due to spatial aliasing, it is often difficult or impossible to discriminate spatially at higher frequencies. Therefore, linear echo cancellation may be performed only in a selected range of low frequencies on the secondary channels. The spatial processing within the noise suppressor 216 may only be done for this selected range of frequencies. In other words, linear echo cancellation for the secondary channels may only be performed in the frequency range over which spatial processing is effective (using the sub-band LECs 222a-b). Linear echo cancellation may be done on the entire band only for the primary channel (using the full-band LEC 220), so the higher frequencies of the primary microphone 204a survive the spatial processor 224 as shown in FIG. 2. In other words, the spatial processor 224 of the NS may take all N channel's selected low frequencies and produce a spatially processed corresponding set of low frequencies. Linear echo-cleaned higher frequencies of the primary microphone 204a may then be combined with these low frequencies before giving it to the full-band noise suppression post-processor 226, which works on the entire band of data. Noise suppression post-processing may include non-linear, spectral-subtraction based processing where the noise reference from the spatial processing could serve as the unwanted component.

In an ideal environment, non-linear echo processing would not be used in an echo control system, i.e., the linear echo canceller 214 would be sufficient to achieve echo-free full duplex conversation. However, the linear adaptive filter in the linear echo canceller 214 may only remove the linear echo. In other words, the linear echo canceller 214 may not be able to suppress non-linear echo components that are typically mixed with the linear echo. This remaining non-linear echo may be audible and degrade the overall quality of communication. Furthermore, the adaptive filter used in an acoustic echo canceller (AEC) filter to model the room response may be shorter than the true room response, thereby leaving some residual tail echo after the linear echo cancellation. To address this problem of residual tail/non-linear echo, typically a non-linear echo post-processor 218 may be employed.

The echo post-processor 218 may receive the noise suppressed single channel data from the noise suppressor 216 and remove the residual tail and/or non-linear echo. Specifically, the full-band echo post-processor 228 may use a spectral subtraction-based scheme to remove any residual non-linear echo by modeling the harmonic distortions created due to the loud-speaker. The full-band non-linear echo clipper 230 may then further suppress any residual echo. Therefore, the non-linear echo clipper 230 may alleviate the burden on the spectral subtraction-based scheme (in the echo post-processor 228) in removing strong residual echoes and thereby improving full-duplex capabilities. These modules 228, 230 may keep track of the echo attenuation provided blindly by the NS post-processor 226 and update their gain accordingly, thereby preventing excessive echo attenuation. These non-linear processes may modulate the noise floor and, if left un-addressed, may be annoying to the listener at the far-end. To handle these modulations, a full-band comfort noise injector 233 may undo the modulations created to the noise floor due to these non-linear processes.

As used herein, the term "far-end" refers to something not in relative proximity to a communication device. Conversely the term "near-end" refers to something in relative proximity to the communication device. In other words, the speech of a user of the communication device may generate a near-end signal while the speech of another person communicating remotely (far-end user) may generate a far-end signal.

In addition to using the illustrated sequence of an LEC 214, an NS 216 and an echo post-processor 218, one or more flags may be generated based on characteristics of the audio channels. These flags may be used to adapt the processing carried out in the integrated echo cancellation and noise suppression module 206. Specifically, four different types of flags may be generated and used by the subsequent modules for optimal performance: clipping flags 236, a far-end flag, a doubletalk flag 232 and a near-end flag 234.

The clipping flags 236 may be generated within the linear echo canceller 214 based on the echo attenuation that it provides. The clipping flags 236 may be used by the echo post-processor 218 for residual echo suppression. In speakerphone environments, acoustic echoes may be a major problem, and the desired talker-to-echo ratio may be on the order of −4 to −12 dB. The clipping flags 236 may be used in the non-linear echo clipper 230 to further suppress the residual echo. These flags 236 may be generated using the echo attenuation provided by the linear echo canceller 214. If the echo attenuation provided by the linear echo canceller 214 is high, that may imply strong echo portions that are most likely echo-only periods. Thus, the residual signal after echo cancellation and noise suppression may be further suppressed.

Since the primary channel survives the noise suppression scheme, the echo attenuation provided by the linear echo canceller 214 of the primary channel in the lower and higher bands may be used to determine values for two non-linear clipping flags 236 for the corresponding frequency bands. Specifically, the measure of echo attenuation may be determined by the linear echo canceller according to Equation (2):

$$ERLE = \left(\frac{\sigma_m^2[n]}{\sigma_e^2[n]}\right) \quad (2)$$

where ERLE is the echo return loss enhancement that indicates the amount of attenuation provided by the LEC 214, n is an index and $\sigma_m^2[n]$ is a signal energy of the primary channel according to the exponential recursive update Equation (3):

$$\sigma_m^2[n] = \lambda \sigma_m^2[n-1] + (1-\lambda)m^2[n] \quad (3)$$

where $\lambda$ is an exponential weighting factor and m is the microphone signal. In one configuration, $\lambda$ may be a value between 0.9 and 1. The signal $\sigma_e^2[n]$ is the residual error energies according to the exponential recursive update Equation (4):

$$\sigma_e^2[n] = \lambda \sigma_{e_{fg}}^2[n-1] + (1-\lambda)e^2[n] \quad (4)$$

where e is the residual error signal, i.e., the error signal after linear echo cancellation. Finally, the non-linear clipping flags 236 for each band may be computed based on the echo attenuation according to Equation (5):

$$clip\_flag = \begin{cases} 1 & \text{if } ERLE > \text{Threshold} \\ 0 & \text{if } ERLE < \text{Threshold} \end{cases} \quad (5)$$

where one possible values for the thresholds is 12 dB.

A far-end flag may also be determined that indicates far-end voice activity. A simple energy-based voice activity detector (VAD) may be used to detect the far-end activity. Thresholds for far-end voice activity may be chosen at a higher end so that only relatively strong far-end speech portions are detected. Specifically, it may be desirable to detect those portions of far-end speech that may leave some residual echo after the linear echo cancellation. This binary far-end voice activity flag may be used by the noise suppressor 216 to determine whether to learn the source position and to avoid accidentally learning in the direction of the echo as the desired source direction. In one configuration, the far-end flag may be used to determine the doubletalk flag 232 that is used to determine whether the spatial processor 224 should attempt to learn in the direction of a desired signal.

The doubletalk flag 232 may update the status of the linear echo canceller 214. In other words, the doubletalk flag 232 may be high in true doubletalk situations i.e. true overlap of far-end and near-end speech periods. The doubletalk flag 232 may also be high when the echo attenuation provided by the linear echo canceller 214 is very low. Therefore, the doubletalk flag 232 may serve two different objectives. First, it may prevent spatial processing and source learning by the spatial processor 224 during true doubletalk periods, thereby preventing any undesirable near-end talker attenuation during such periods. Second, the doubletalk flag 232 may also be high when the echo attenuation provided by the linear echo canceller 214 is minimal Source learning may not performed by the spatial processor 224 during such periods to prevent any accidental learning towards the relatively strong residual acoustic echoes.

The doubletalk flag 232 may be generated using the echo attenuation provided by the linear echo canceller 214 and the far-end voice activity flag. Only the outputs of the foreground filter may survive after the linear echo cancellation. Therefore, the ERLE may be determined from the foreground filter of the primary channel in the lower band in dB according to Equation (6):

$$ERLE = 10\log_{10}\left(\frac{\sigma_m^2[n]}{\sigma_e^2[n]}\right) \quad (6)$$

Where the microphone signal and the residual error energies are estimated using Equations (3) and (4) above. Next, a logistic or sigmoid function may be used to transform the ERLE into the probability of the desired events (either poor ERLE or doubletalk), referred to as "prob," using Equation (7):

$$prob = \left(1 - \left(\frac{1}{1 + e^{-ERLE}}\right)\right) \quad (7)$$

Finally, the probability of the poor ERLE or doubletalk as obtained above is multiplied with the binary far-end activity flag to generate a continuous doubletalk-only flag 232 (dtd_only_flag) according to Equation (8):

$$dtd\_only\_flag = (prob)(farend_{VADNS_{flag}}) \quad (8)$$

where $farend_{VADNS_{flag}}$ is the far-end flag. The generated continuous doubletalk-only flag 232 may be used within the noise suppressor 216 for source localization and applying the spatial processing appropriately.

A near-end flag 234 may also be determined that indicates near-end voice activity. The near-end flag 234 may be used by the echo post-processor 228 to determine the aggressiveness of the non-linear echo post-processing. For example, any doubletalk detection flag 232 may serve as a near-end flag 234.

The present systems and methods may also be applied to a single microphone configuration. In a single microphone configuration, no spatial processing may be performed, however, the doubletalk flag 232 may be used to determine whether to perform non-linear noise suppression. Furthermore, a single microphone configuration may also include the echo post-processor 218 as illustrated in FIG. 2.

Figure 3:
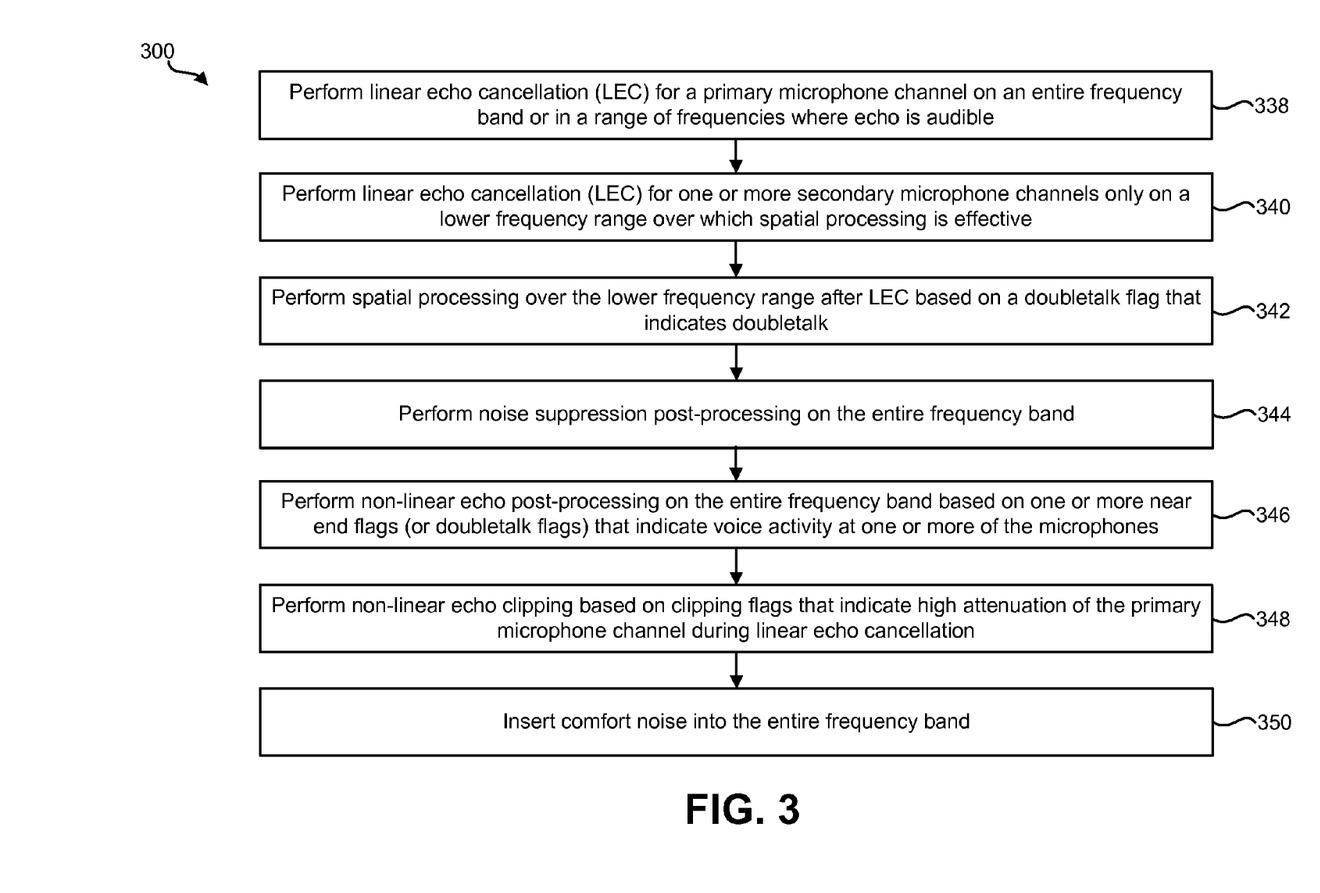
FIG. 3 is a flow diagram illustrating a method for echo cancellation and noise suppression.

FIG. 3 is a flow diagram illustrating a method 300 for echo cancellation and noise suppression. The method 300 may be performed by an integrated echo cancellation and noise suppression module 206. The module 206 may perform 338 linear echo cancellation (LEC) for a primary microphone channel on an entire frequency band or in a range of predetermined frequencies where echo is audible. The module 206 may also perform 340 LEC for one or more secondary microphone channels only on a lower frequency range over which spatial processing is effective. The module 206 may also perform 342 spatial processing over the lower frequency range after LEC based on a doubletalk flag 232 that indicates doubletalk. The high-band frequencies from the primary microphone 204a may be combined with the spatially processed low-band frequencies to form a single channel. The module 206 may also perform 344 noise suppression post-processing on the entire frequency band. The module 206 may also perform 346 non-linear echo post-processing on the entire frequency band based on one or more near-end flags 234 that indicate voice activity at one or more of the microphones. In one configuration, the non-linear echo post-processing may be performed based on one or more doubletalk flags 232 that indicate periods of overlapping near-end and far-end speech, i.e., the doubletalk flags 232 may be used as near-end flags 234. The module 206 may also perform 348 non-linear echo clipping based on clipping flags 236 that indicate high attenuation of the primary microphone channel during linear echo cancellation. The module 206 may also insert 350 comfort noise into the entire frequency band.

Figure 4:
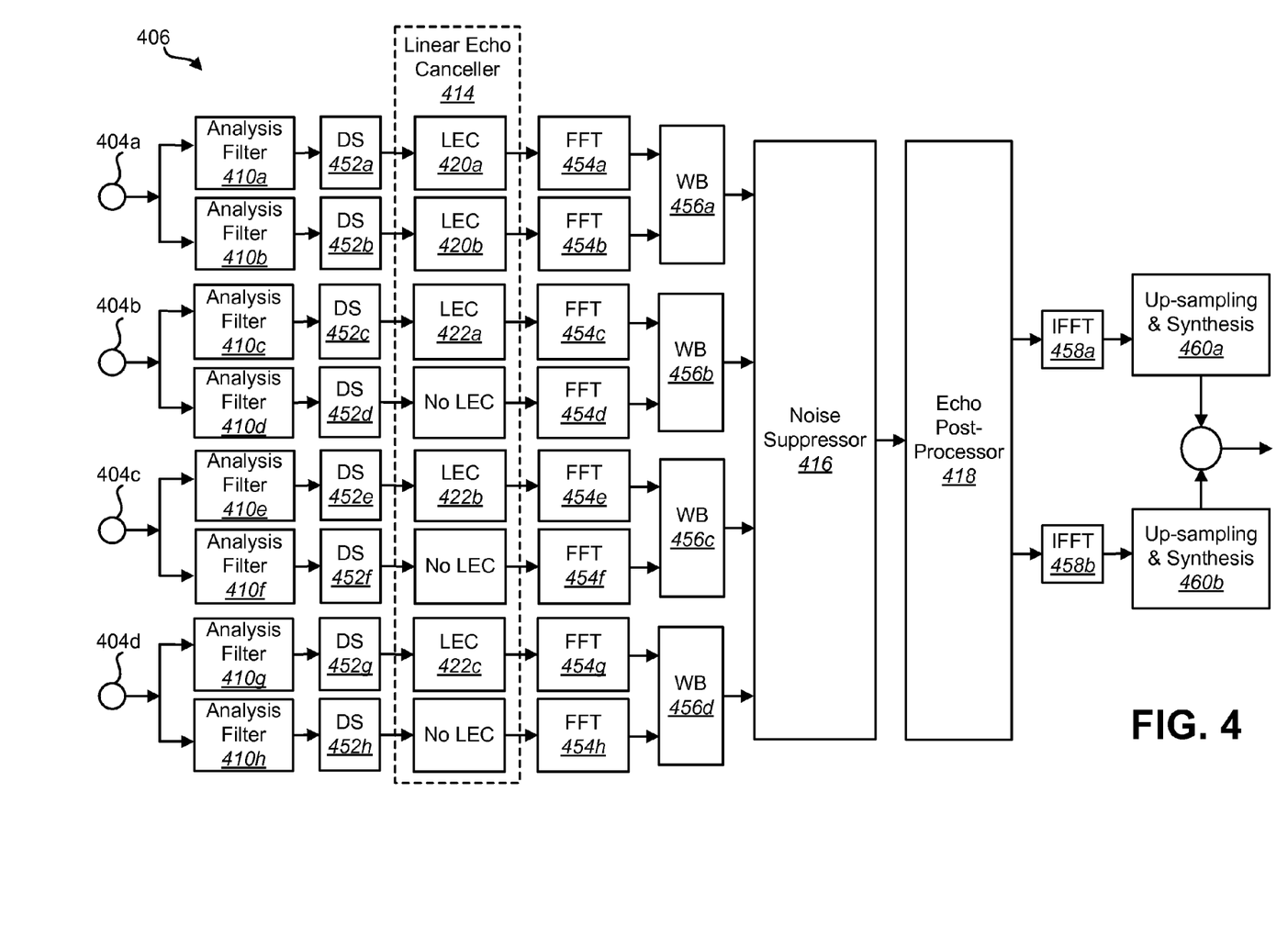
FIG. 4 is a block diagram illustrating another configuration of an integrated echo cancellation and noise suppression module.

FIG. 4 is a block diagram illustrating another configuration of an integrated echo cancellation and noise suppression module 406. This configuration may include four microphones 404a-d. The signals received at the microphones 404a-d may be decomposed into high-band and low-band frequencies by analysis filters 410a-h, e.g., filter banks. The deconstructed band signals may be down sampled by down samplers 452a-h. After down sampling, a linear echo canceller 414 may use a full-band linear echo canceller 420a-b on the primary microphone 404a channel and a non-full-band linear echo canceller 422a-c on the secondary microphone 404b-d channels. In one configuration, linear echo cancellation may only be performed in the secondary channels on the frequencies over which spatial processing is effective. Fast Fourier Transform (FFT) modules 454a-h may convert the linear echo-cancelled signals into the frequency domain and wideband modules 456a-d may combine the high-band frequencies with the low-band frequencies to form wideband signals.

The noise suppressor 416 may perform frequency domain spatial processing on a selected set of low frequencies and non-linear noise suppression post-processing on the entire band of data. Spatial processing may include selecting one of the audio channels that best includes a desired signal and attenuating the non-selected audio channels, e.g., beamforming, masking, etc. An echo post-processor 418 may remove the non-linear echo and residual echo. Inverse Fast Fourier Transform (IFFT) modules 458a-b may return the signals to the time domain after which the high-band and low-band signals may be up sampled and reconstructed by a synthesis module 460a-b. The analysis modules 410a-h and synthesis filters 460a-b may refer to finite impulse response filter banks that decompose a wideband signal into sub-bands and reconstructs the sub-bands into a single band, respectively.

Figure 5:
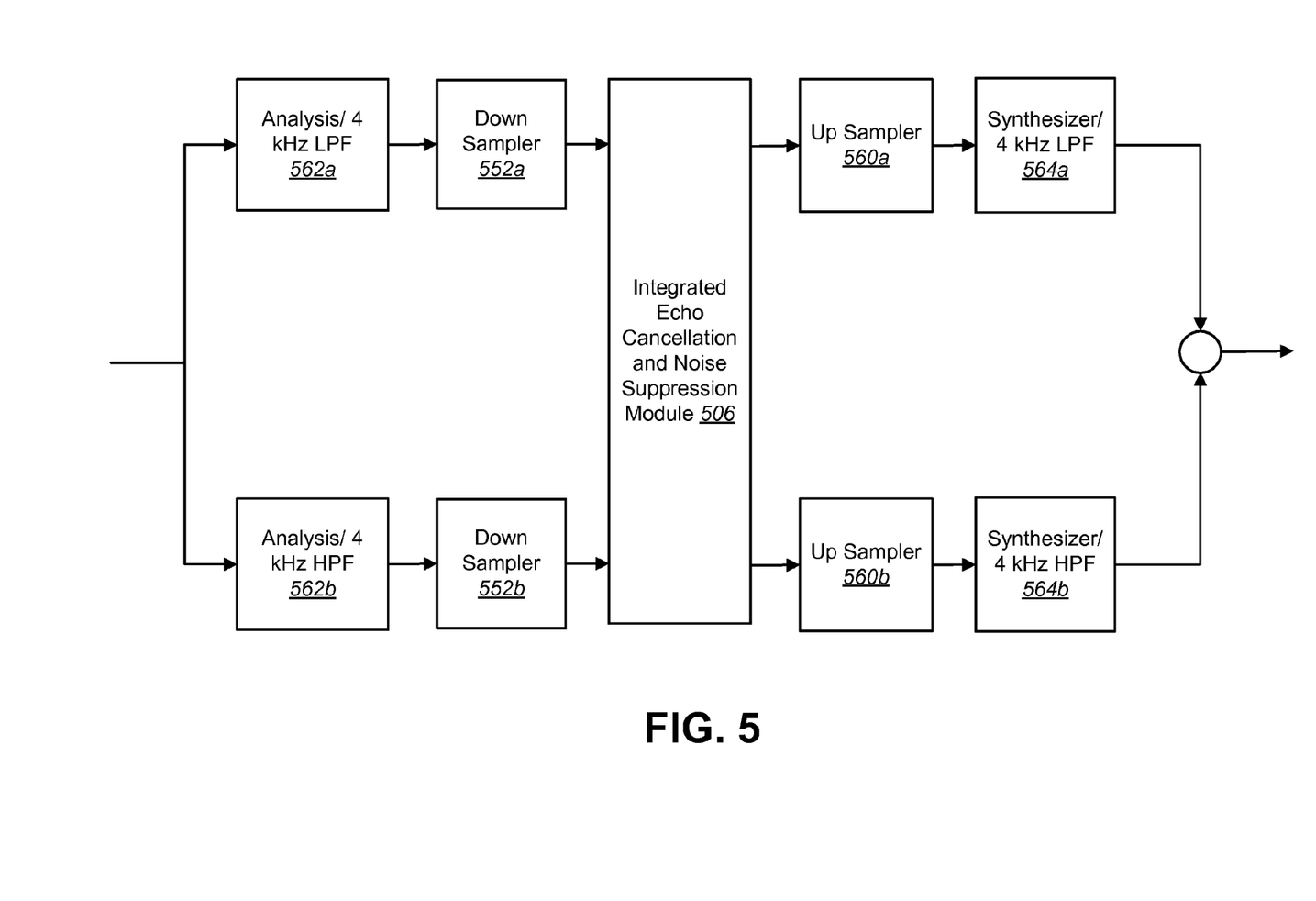
FIG. 5 is a block diagram illustrating an integrated echo cancellation and noise suppression module in a wideband architecture, i.e., a system that codes speech from 0-8 kHz.

FIG. 5 is a block diagram illustrating an integrated echo cancellation and noise suppression module 506 in a wideband architecture, i.e., a system that codes speech from 0-8 kHz. The signal received at a microphone may be split into high-band and low-band frequencies, and each band deconstructed at analysis modules 562a-b. The low-band frequencies may be low pass filtered (e.g., 0-4 kHz) to remove any high frequencies and the high-band frequencies may be high-pass filtered (e.g., 4-8 kHz) to remove any low frequencies. Both bands may be down sampled using a down sampler 552a-b, e.g., by a factor of 2. An integrated echo cancellation and noise suppression module 506 may perform linear echo cancellation, followed by noise suppression (including spatial processing and non-linear post-processing), followed by echo post-processing (including echo post-processing, echo clipping and comfort noise injection). The different bands may be up sampled by an up sampler 560a-b (e.g., by a factor of 2) and reconstructed and filtered by a synthesizer 564a-b. The analysis modules 562a-b and synthesis modules 564a-b may refer to finite impulse response filter banks that decompose a wideband signal into sub-bands and reconstructs the sub-bands into a single band, respectively.

Figure 6:
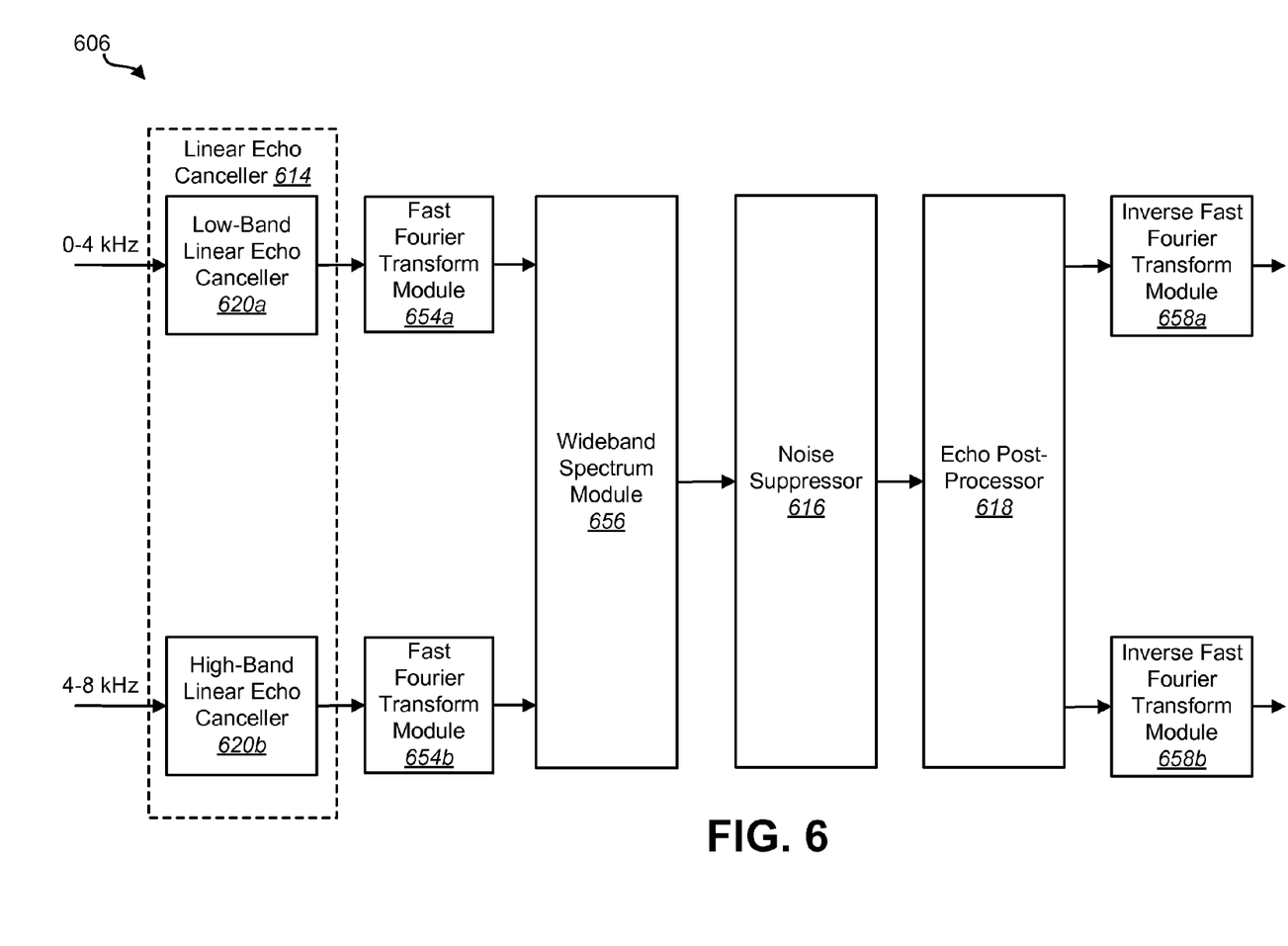
FIG. 6 is a block diagram illustrating another configuration of an integrated echo cancellation and noise suppression module in a wideband architecture, i.e., a system that codes speech from 0-8 kHz.

FIG. 6 is a block diagram illustrating another configuration of an integrated echo cancellation and noise suppression module 606 in a wideband architecture, i.e., a system that codes speech from 0-8 kHz. The signal received at a microphone 704 may be split into high-band and low-band frequencies, e.g., 0-4 kHz and 4-8 kHz. A low-band linear echo canceller 620a portion of an LEC 614 may cancel the linear echo in the low frequencies and a high-band linear echo canceller 620b portion may cancel the linear echo in the high frequencies. The linear echo-cancelled high-band and low-band frequencies may be transformed into the frequency domain by FFT modules 654a-b and combined into a wideband signal by a wideband spectrum module 656. A noise suppressor 616 may spatially process and NS post-process the channel. An echo post-processor 618 may then remove the non-linear echo and residual echo. IFFT modules 658a-b may then return the signal to the time domain.

Figure 7:
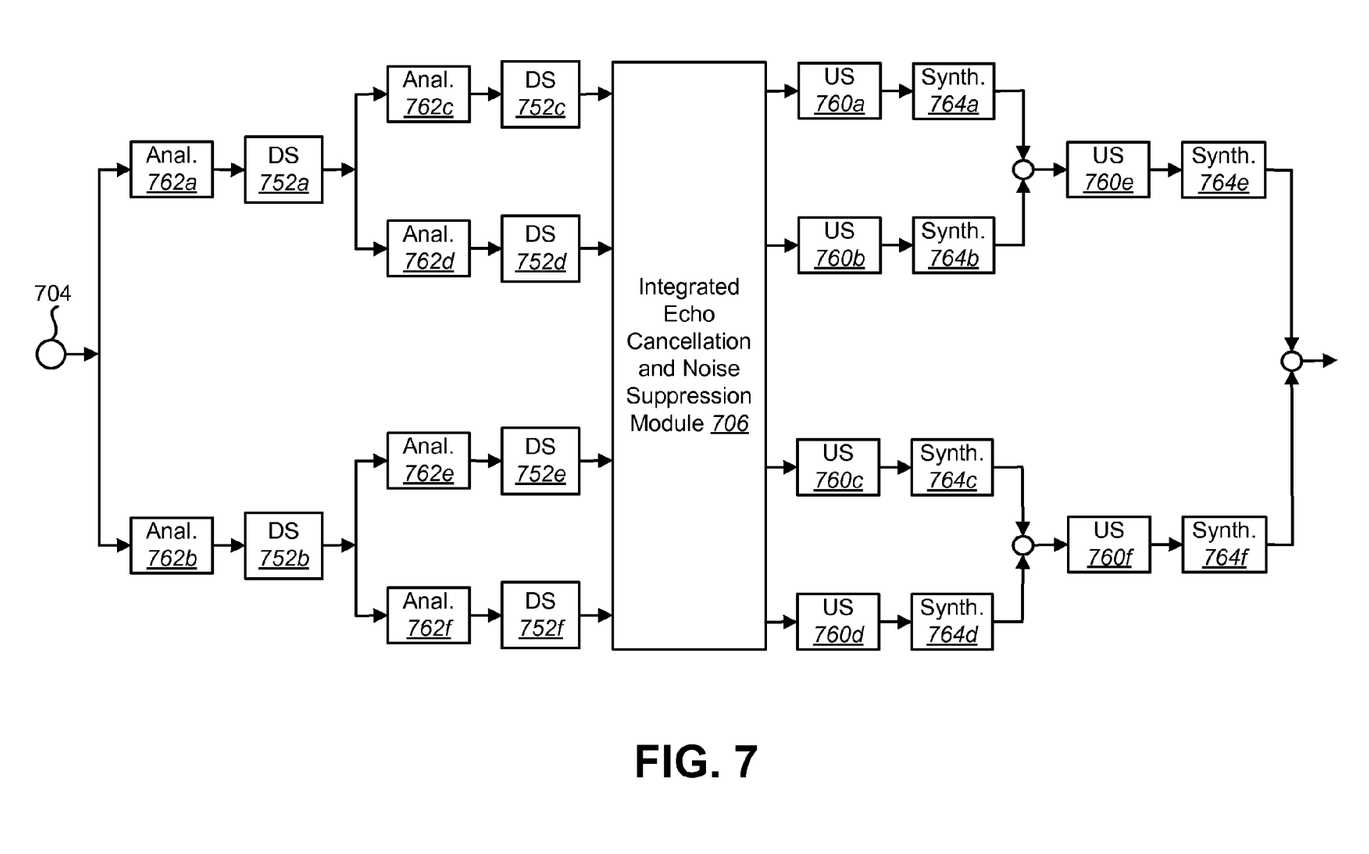
FIG. 7 is a block diagram illustrating an integrated echo cancellation and noise suppression module in a super-wideband architecture, i.e., a system that codes speech from 0-16 kHz.

FIG. 7 is a block diagram illustrating an integrated echo cancellation and noise suppression module 706 in a super-wideband architecture, i.e., a system that codes speech from 0-16 kHz. The signal received at a microphone may be split into high-band and low-band frequencies, and each band may be analyzed by an analysis modules 762a-b. Both bands may be down sampled using a down sampler 752a-b, e.g., by a factor of 2. Both bands may again be split into sub-bands, e.g., the low-band frequencies may be split into 0-4 kHz and 4-8 kHz sub-bands while the high-band frequencies may be split into 8-12 kHz and 12-16 kHz sub-bands. Each sub-band may then be analyzed by an analysis module 762c-f and down sampled by a down sampler 752c-f.

An integrated echo cancellation and noise suppression module 706 may perform linear echo cancellation, followed by noise suppression (including spatial processing and non-linear post-processing), followed by echo post-processing (including echo post-processing, echo clipping and comfort noise injection).

The different sub-bands may be up sampled by an up sampler 760a-d (e.g., by a factor of 2) and synthesized by a synthesizer 764a-d. The sub-bands may then be combined into the high-band and low-band that may be up sampled and synthesized again, i.e., by up samplers 760e-f and synthesizers 764e-f.

In the present systems and methods, the wide-band spectrum may be split into multiple sub-bands using analysis filter bank (i.e., the analysis modules 762a-b) and synthesis filter banks may be used for near-perfect reconstruction (i.e., the synthesizers 764a-f). These filter banks may be designed very carefully for these applications. Perfect reconstruction based infinite impulse response (IIR) filter banks may be one possible way to perform sub-band coding. However, these filter banks may be less suitable for sub-band adaptive filtering because perfect reconstruction with aliasing cancellation is not possible when the sub-band signals are modified with arbitrary amplitude and phase response. Such IIR filter banks may also not suitable for sub-band adaptive beamforming and masking with microphone arrays/multiple microphones 704.

Since a beamformer may alter the phase information of the signals, signal degradation may result when perfect reconstruction filter banks are used for sub-band decomposition and reconstruction.

To address these issues, the present systems and methods may utilize special finite impulse response (FIR) filter banks to minimize the magnitude of all aliasing components individually. Therefore, the aliasing distortions may be minimized although the phase alterations occur in the sub-bands. Furthermore, the filter banks may be designed in a way so that the adaptive filtering in the sub-bands causes minimal signal degradations in the output.

Figure 8:
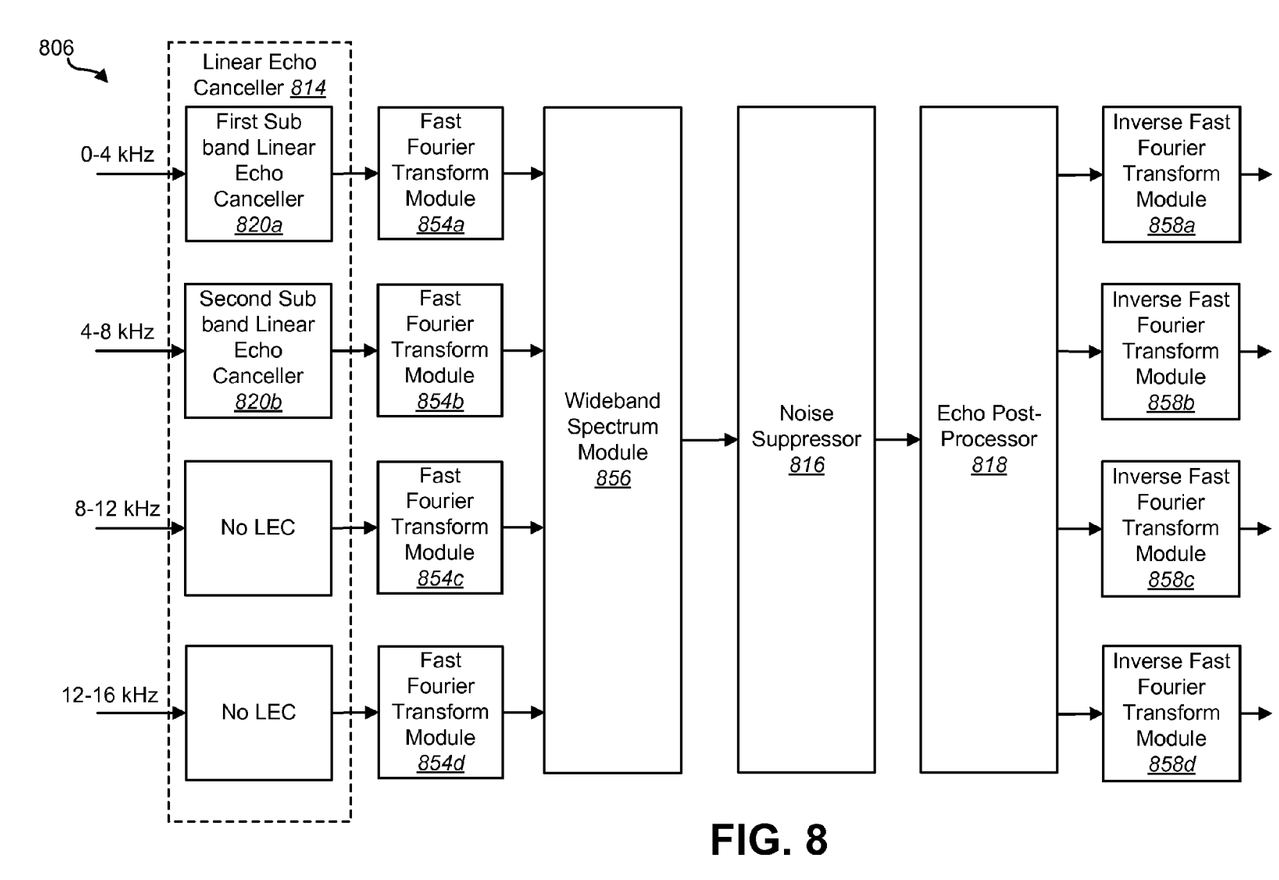
FIG. 8 is a block diagram illustrating another configuration of an integrated echo cancellation and noise suppression module in a super-wideband architecture, i.e., a system that codes speech from 0-16 kHz.

FIG. 8 is a block diagram illustrating another configuration of an integrated echo cancellation and noise suppression module 806 in a super-wideband architecture, i.e., a system that codes speech from 0-16 kHz. The signal received at a microphone may be split into four frequency sub-bands, e.g., a first sub-band (0-4 kHz), a second sub-band (4-8 kHz), a third sub-band (8-12 kHz) and a fourth sub-band (12-16 kHz). A first sub-band linear echo canceller 820a in an LEC 814 may cancel the linear echo in the first sub-band (0-4 kHz) frequency sub-band and a second sub-band linear echo canceller 820b in the LEC 814 may cancel the linear echo in the second sub-band (4-8 kHz) frequency sub-band. The third sub-band (8-12 kHz) and fourth sub-band (12-16 kHz) may not be linear echo-cancelled. The sub-bands may be transformed into the frequency domain by FFT modules 854a- and combined into a wideband signal by a wideband spectrum module 856. A noise suppressor 816 may spatially process and NS post-process the channel. An echo post-processor 818 may then remove the non-linear echo and residual echo. IFFT modules 858a-d may then return the signal to the time domain.

Figure 9:
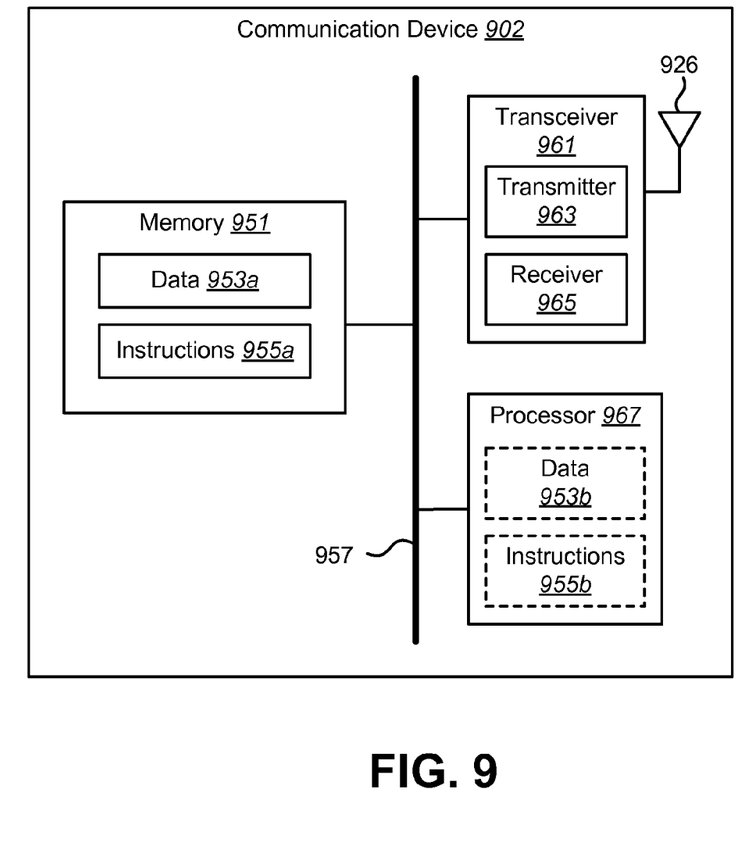
FIG. 9 illustrates certain components that may be included within a communication device.

FIG. 9 illustrates certain components that may be included within a communication device 902. The communication device 102 in FIG. 1 may be configured similarly to the communication device 902 that is shown in FIG. 9. Examples of communication devices 902 include speakerphones, telephones, Bluetooth headsets, cellular phones, handheld wireless devices, wireless modems, laptop computers, personal computers, etc.

The communication device 902 includes a processor 967. The processor 967 may be a general purpose single- or multichip microprocessor (e.g., an ARM), a special purpose microprocessor (e.g., a digital signal processor (DSP)), a microcontroller, a programmable gate array, etc. The processor 967 may be referred to as a central processing unit (CPU). Although just a single processor 967 is shown in the communication device 902 of FIG. 9, in an alternative configuration, a combination of processors (e.g., an ARM and DSP) could be used.

The communication device 902 also includes memory 951 in electronic communication with the processor 967 (i.e., the processor 967 can read information from and/or write information to the memory 951). The memory 951 may be any electronic component capable of storing electronic information. The memory 951 may be random access memory (RAM), read-only memory (ROM), magnetic disk storage media, optical storage media, flash memory devices in RAM, on-board memory included with the processor, programmable read-only memory (PROM), erasable programmable read-only memory (EPROM), electrically erasable PROM (EEPROM), registers and so forth, including combinations thereof.

Data 953a and instructions 955a may be stored in the memory 951. The instructions 955a may include one or more programs, routines, sub-routines, functions, procedures, etc. The instructions 955a may include a single computer-readable statement or many computer-readable statements. The instructions 955a may be executable by the processor 967 to implement the methods that were described above in connection with the access terminals 122. Executing the instructions 955a may involve the use of the data 953a that is stored in the memory 951. FIG. 9 shows some instructions 955b and data 953b being loaded into the processor 967.

The communication device 902 may also include a transmitter 963 and a receiver 965 to allow transmission and reception of signals between the communication device 902 and a remote location. The transmitter 963 and receiver 965 may be collectively referred to as a transceiver 961. An antenna 926 may be electrically coupled to the transceiver 961. The communication device 902 may also include (not shown) multiple transmitters, multiple receivers, multiple transceivers and/or multiple antenna.

The various components of the communication device 902 may be coupled together by one or more buses, which may include a power bus, a control signal bus, a status signal bus, a data bus, etc. For simplicity, the various buses are illustrated in FIG. 9 as a bus system 957.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in hardware, software, firmware, or any combination thereof. If implemented in software, the functions may be stored as one or more instructions on a computer-readable medium. The terms "computer-readable medium" or "computer-program product" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIG. 3 can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for echo cancellation and noise suppression, comprising:
    performing linear echo cancellation (LEC) for a primary microphone channel on first and second frequency ranges, the second frequency range being higher than the first frequency range;
    performing LEC for at least one secondary microphone channel on the first frequency range;
    spatially processing the primary and secondary microphone channels over the first frequency range after LEC to form a channel; and
    combining the channel after said spatial processing with the second frequency range of the primary microphone channel after LEC.

2. The method of claim 1, wherein the spatial processing comprises phase correlation-based masking.

3. A method for echo cancellation and noise suppression, comprising:
    performing linear echo cancellation (LEC) for a primary microphone channel on at least a range of frequencies where echo is audible;
    performing LEC for at least one secondary microphone channel only on a low frequency range over which spatial processing is effective; and
    spatially processing the primary and secondary microphone channels over the low frequency range after LEC, wherein the spatial processing is performed based on a doubletalk flag that is determined using a computed probability according to the equation $$prob = \left(1 - \left(\frac{1}{1 + e^{-ERLE}}\right)\right),$$

wherein ERLE is a measure of echo attenuation provided during linear echo cancellation.

4. The method of claim 3, wherein no spatial processing is performed when the doubletalk flag indicates that far-end and near-end speech periods overlap or that echo attenuation provided by said performing LEC for the primary microphone channel is low.

5. A method for echo cancellation and noise suppression, comprising:
    performing linear echo cancellation (LEC) for a primary microphone channel on at least a range of frequencies where echo is audible;
    performing LEC for at least one secondary microphone channel only on a low frequency range over which spatial processing is effective;
    spatially processing the primary and secondary microphone channels over the low frequency range after LEC to form a channel, wherein the spatial processing is performed based on a doubletalk flag that indicates when far-end speech and near-end speech periods overlap or when echo attenuation provided during linear echo cancellation is low; and
    performing non-linear echo post-processing on the channel after said spatial processing, on at least the range of frequencies where echo is audible and based on the doubletalk flag, wherein the non-linear echo post-processing removes residual non-linear echo from the channel.

6. The method of claim 5, wherein said method comprises performing non-linear echo clipping based on a clipping flag that indicates high attenuation of at least a corresponding band of the primary microphone channel during linear echo cancellation, wherein the non-linear echo clipping removes residual echo from the channel after said post-processing,
    wherein the clipping flag tracks echo attenuation during linear echo cancellation.

7. The method of claim 6, wherein the clipping flag is high if the echo attenuation during linear echo cancellation is above a predetermined threshold and low if the echo attenuation during linear echo cancellation is below a predetermined threshold.

8. An apparatus for echo cancellation and noise suppression, comprising:

a linear echo canceller configured to perform linear echo cancellation (LEC) for a primary microphone channel on at least a range of frequencies where echo is audible and for at least one secondary microphone channel only on a low frequency range over which spatial processing is effective;

a spatial processor configured to spatially process the primary and secondary microphone channels over the low frequency range after LEC to form a channel; and a post-processor configured to combine the channel after said spatial processing with the second frequency range of the primary microphone channel after LEC.

9. The apparatus of claim 8, wherein the spatial processor is configured to use phase correlation-based masking to spatially process the microphone channels.

10. The apparatus of claim 8, wherein the spatial processor is configured to operate based on a doubletalk flag that is determined using a computed probability according to the equation $$prob = \left(1 - \left(\frac{1}{1 + e^{-ERLE}}\right)\right),$$

wherein ERLE is a measure of echo attenuation provided by the linear echo canceller.

11. The apparatus of claim 10, wherein the spatial processor is configured to not spatially process the microphone channels when the doubletalk flag indicates that far-end and near-end speech periods overlap or that echo attenuation provided by the linear echo canceller is low.

12. The apparatus of claim 8, said apparatus comprising a non-linear echo post-processor configured to perform non-linear echo post-processing on the channel after said spatial processing, on at least the range of frequencies where echo is audible and based on at least one doubletalk flag, wherein the non-linear echo post-processing removes residual non-linear echo from the channel.

13. The apparatus of claim 12, wherein said apparatus comprises a non-linear echo clipper configured to perform non-linear echo clipping based on a clipping flag that indicates high attenuation of at least a corresponding band of the primary microphone channel during linear echo cancellation, wherein the non-linear echo clipping removes residual echo from the channel after said post-processing, and wherein the clipping flag tracks echo attenuation during linear echo cancellation.

14. The apparatus of claim 13, wherein the clipping flag is high if the echo attenuation during linear echo cancellation is above a predetermined threshold and low if the echo attenuation during linear echo cancellation is below a predetermined threshold.

15. An apparatus for echo cancellation and noise suppression, comprising:

means for performing linear echo cancellation (LEC) for a primary microphone channel on at least a range of frequencies where echo is audible;

means for performing LEC for at least one secondary microphone channel only on a low frequency range over which spatial processing is effective; and means for spatially processing the primary and secondary microphone channels over the low frequency range after LEC to form a channel;

wherein the means for spatially processing is configured to operate based on a doubletalk flag that is determined using a computed probability according to the equation prob=

$$prob = \left(1 - \left(\frac{1}{1 + e^{-ERLE}}\right)\right),$$

wherein ERLE is a measure of echo attenuation provided by the means for performing LEC for the primary microphone channel.

16. The apparatus of claim 15, wherein the means for spatially processing is configured to use phase correlation-based masking to spatially process the microphone channels.

17. The apparatus of claim 15, wherein said apparatus comprises means for combining the channel after said spatial processing with the second frequency range of the primary microphone channel after LEC.

18. The apparatus of claim 15, wherein the means for spatially processing is configured to not spatially process the microphone channels when the doubletalk flag indicates that far-end and near-end speech periods overlap or that echo attenuation provided by the means for performing LEC for the primary microphone channel is low.

19. The apparatus of claim 15, wherein the means for spatially processing is configured to operate based on the doubletalk flag, and wherein said apparatus comprises means for performing non-linear echo post-processing on the channel after said spatial processing, on at least the range of frequencies where echo is audible and based on the doubletalk flag, wherein the non-linear echo post-processing removes residual non-linear echo from the channel.

20. The apparatus of claim 19, wherein said apparatus comprises means for performing non-linear echo clipping based on a clipping flag that indicates high attenuation of at least a corresponding band of the primary microphone channel during linear echo cancellation, wherein the non-linear echo clipping removes residual echo from the channel after said post-processing, and wherein the clipping flag tracks echo attenuation during linear echo cancellation.

21. The apparatus of claim 20, wherein the clipping flag is high if the echo attenuation during linear echo cancellation is above a predetermined threshold and low if the echo attenuation during linear echo cancellation is below a predetermined threshold.

22. A computer-program product for echo cancellation and noise suppression, the computer-program product comprising a non-transitory computer-readable medium having instructions thereon, the instructions comprising:

code for causing a communication device to perform linear echo cancellation (LEC) for a primary microphone channel on at least a range of frequencies where echo is audible;

code for causing the communication device to perform LEC for at least one secondary microphone channel only on a low frequency range over which spatial processing is effective; and code for causing the communication device to spatially process the primary and secondary microphone channels over the low frequency range after LEC to form a channel, wherein the code for causing the communication device to spatially process is based on a doubletalk flag that is determined using a computed probability according to the equation $$prob = \left(1 - \left(\frac{1}{1 + e^{-ERLE}}\right)\right),$$

wherein ERLE is a measure of echo attenuation provided during linear echo cancellation.

23. The computer-program product of claim 22, wherein the code for causing the communication device to spatially process comprises code for causing the communication device to perform phase correlation-based masking.

24. The computer-program product of claim 22, wherein said instructions comprise code for combining the channel after said spatial processing with the second frequency range of the primary microphone channel after LEC.

25. The computer-program product of claim 22, wherein the code for causing the communication device to spatially process comprises code for causing the communication device to not spatially process when the doubletalk flag indicates that far-end and near-end speech periods overlap or that echo attenuation provided by the communication device in response to said code for causing the communication device to perform LEC for a primary microphone channel is low.

26. The computer-program product of claim 22, wherein the code for causing the communication device to spatially process comprises code for causing the communication device to not spatially process when the doubletalk flag indicates that far-end and near-end speech periods overlap or that echo attenuation provided by the communication device in response to said code for causing the communication device to perform LEC for a primary microphone channel is low, and
wherein said instructions comprise code for causing the communication device to perform non-linear echo post-processing on the channel after said spatial processing, on at least the range of frequencies where echo is audible and based on the doubletalk flag, wherein the non-linear echo post-processing removes residual non-linear echo from the channel.

27. The computer-program product of claim 26, wherein said instructions comprise code for causing the communication device to perform non-linear echo clipping based on a clipping flag that indicates high attenuation of at least a corresponding band of the primary microphone channel during linear echo cancellation, wherein the non-linear echo clipping removes residual echo from the channel after said post-processing, and
wherein the clipping flag tracks echo attenuation during linear echo cancellation.

28. The computer-program product of claim 27, wherein the clipping flag is high if the echo attenuation during linear echo cancellation is above a predetermined threshold and low if the echo attenuation during linear echo cancellation is below a predetermined threshold.

29. The method of claim 3, wherein said doubletalk flag indicates when far-end speech and near-end speech periods overlap or when echo attenuation provided during linear echo cancellation is low.

30. The method of claim 5, wherein said doubletalk flag indicates when far-end speech and near-end speech periods overlap or when echo attenuation provided during linear echo cancellation is low.

31. The method of claim 5, said method comprising:
performing non-linear echo clipping on the channel after said spatial processing, based on clipping flags that indicate high attenuation of the primary microphone channel during linear echo cancellation, wherein the non-linear echo clipping removes residual echo from the channel; and
injecting comfort noise into the channel after clipping.

32. A non-transitory computer-readable medium having instructions thereon, the instructions comprising code for causing a communication device to perform the method according to claim 1.

33. The method of claim 1, wherein the spatial processing is performed based on a probability that is high for negative values of echo return loss enhancement (ERLE) and low for positive values of ERLE.

34. The method of claim 1, said method comprising performing nonlinear post-processing on the channel after said combining, based on modeling harmonic distortions created due to a loudspeaker.

35. The method of claim 34, wherein said nonlinear post-processing is based on spectral subtraction.

36. The apparatus of claim 8, wherein the spatial processing is performed based on a probability that is high for negative values of echo return loss enhancement (ERLE) and low for positive values of ERLE.

37. The apparatus of claim 8, said method comprising performing nonlinear post-processing on the channel after said combining, based on modeling harmonic distortions created due to a loudspeaker.

38. The apparatus of claim 37, wherein said nonlinear post-processing is based on spectral subtraction.

39. The medium of claim 32, wherein the spatial processing is performed based on a probability that is high for negative values of echo return loss enhancement (ERLE) and low for positive values of ERLE.

40. The medium of claim 32, said method comprising performing nonlinear post-processing on the channel after said combining, based on modeling harmonic distortions created due to a loudspeaker.

* * * * *